United States Patent
Camenisch et al.

(10) Patent No.: US 9,923,717 B2
(45) Date of Patent: Mar. 20, 2018

(54) REFRESH OF SHARED CRYPTOGRAPHIC KEYS

(71) Applicant: International Business Machines Corporation, Armonk, NY (US)

(72) Inventors: Jan L. Camenisch, Thalwil (CH); Anja Lehmann, Zürich (CH); Gregory Neven, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 14/877,738

(22) Filed: Oct. 7, 2015

(65) Prior Publication Data

US 2017/0104588 A1    Apr. 13, 2017

(51) Int. Cl.
H04L 9/08    (2006.01)

(52) U.S. Cl.
CPC ............ H04L 9/085 (2013.01); H04L 9/0819 (2013.01); H04L 9/0869 (2013.01)

(58) Field of Classification Search
CPC .................................................... H04L 9/085
USPC ............................................................ 380/281
See application file for complete search history.

(56) References Cited

U.S. PATENT DOCUMENTS

2012/0166818 A1*  6/2012  Orsini ..................... H04L 9/085
                                                                    713/193
2013/0022201 A1*  1/2013  Glew ...................... G06F 21/72
                                                                    380/268
2015/0127946 A1*  5/2015  Miller ................. G06F 21/6218
                                                                    713/171

OTHER PUBLICATIONS

Adi Shamir, How to share a secret, MIT Laboratory for Computer Science, Apr. 1979, pp. 1-14.
Christian S. Collberg et al., "Watermarking, tamper-proofing, and obfuscation-tools for software protection", IEEE Transactions on Software Engineering, 28(8):735-746, 2002, reprint with 2 pages cover and pp. 1-15.
Sanjam Garg et al., "Candidate indistinguishability obfuscation and functional encryption for all circuits", 54th FOCS, Jul. 21, 2013, pp. i-44.

* cited by examiner

*Primary Examiner* — Taghi Arani
*Assistant Examiner* — Khalil Naghdali
(74) *Attorney, Agent, or Firm* — Daniel P. Morris; Otterstedt, Ellenbogen & Kammer, LLP

(57) ABSTRACT

One of n≥2 servers, connectable via a network, implements a cryptographic protocol using a secret key K which is shared between the n servers, and includes first and second server compartments. The first is connectable to the network, adapted to implement the cryptographic protocol, and stores a current key share of the secret key K. The second is inaccessible from the network in the operation of the server, stores a set of master keys, and is adapted, for each of successive time periods, to unilaterally generate a new key share of the secret key K and to supply it to the first as the current key share for that time period. The new key share includes a random share of a predetermined value p which is shared between the n servers, and the random share includes a function of the set of master keys.

19 Claims, 5 Drawing Sheets

REFRESH OF SHARED CRYPTOGRAPHIC KEYS

BACKGROUND

The present invention relates generally to refresh of shared cryptographic keys, and more specifically to refresh of a secret key which is shared between a plurality of servers for implementing a cryptographic protocol over a network.

Protecting information is essential in the digital economy. A common way to protect data is to use cryptographic algorithms to process the data in some way, but it is then necessary to protect the secret cryptographic keys which are used in such algorithms. An increasingly popular technique is to distribute (secret share) keys between a plurality of servers which can perform operations with a shared key in a distributed fashion to collectively implement some cryptographic protocol. Cryptography offers a very rich body of protocols for such operations. Sharing a secret key enhances security because more than one server must be subverted by an adversary for the key to be compromised. Some systems also offer so-called "proactive security", whereby a secret key can be refreshed by periodically re-sharing the key among the servers. Proactive security can be realized by letting the servers engage in an interactive refresh protocol to re-compute their key shares.

SUMMARY

According to at least one embodiment of the present invention there is provided a server for operation as one of $n \geq 2$ servers, connectable via a network, to implement a cryptographic protocol using a secret key K which is shared between the n servers. The server comprises first and second server compartments. The first server compartment, which is connectable to the network and adapted to implement the cryptographic protocol, stores a current key share of the secret key K. The second server compartment, which is inaccessible from the network in said operation of the server, stores a set of master keys. The second server compartment is adapted, for each of successive time periods in said operation, to unilaterally generate a new key share of the secret key K and to supply the new key share to the first server compartment as the current key share for that time period. The new key share comprises a random share of a predetermined value p which is shared between the n servers, and the random share comprises a function of the set of master keys.

Further embodiments of the present invention provide a method for refreshing a key share at such a server, and a computer-program product for causing such a server to refresh a key share.

Embodiments of the invention will be described in more detail below, by way of illustrative and non-limiting example, with reference to the accompanying drawings.

BRIEF DESCRIPTION OF THE DRAWINGS

FIG. 8 indicates steps performed by a server to refresh a key share in the second embodiment.

DETAILED DESCRIPTION

Figure 1:
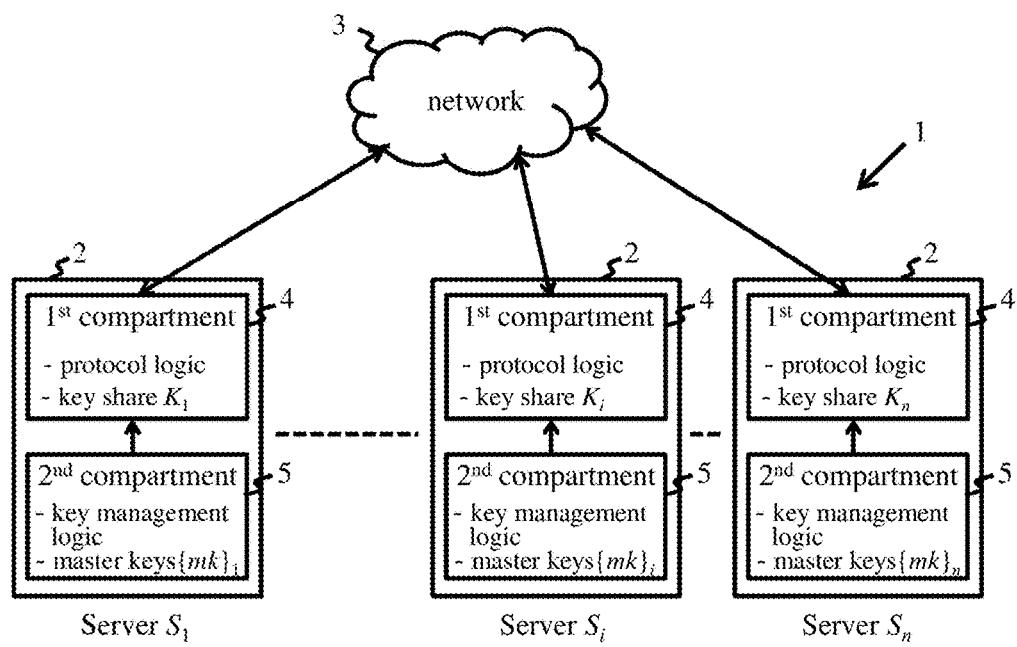
FIG. 1 is a schematic representation of a server system embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic block diagram of a server system 1 comprising a plurality n of servers 2 embodying the invention. The servers are denoted by $S_i$ ($1 \leq i \leq n$), where in general $n \geq 2$, and preferably $n > 2$. For example, a typical system may comprise at least n=3 servers. (In general, higher values of n offer greater protection of cryptographic keys discussed below. The value of n can thus be selected according to security requirements for a given system). The servers $S_1, \ldots, S_n$ are connectable via a network 3 (which may in general comprise one or more component networks and/or internetworks, including the Internet) to implement a cryptographic protocol using a secret key K which is shared between the n servers. The cryptographic protocol may, for instance, comprise a secret sharing scheme, a signature scheme, an encryption scheme, or a more advanced protocol such as threshold password-authenticated secret sharing scheme. However, the particular functionality of the cryptographic protocol is orthogonal to the system operation to be described.

Each server $S_i$ comprises a first server compartment 4 and a second server compartment 5. The first server compartment 4 is connectable to network 3 and is operable, though communication with other servers 2 via the network, to implement the cryptographic protocol using the secret key K. To this end, the first server compartment 4 comprises protocol logic which is adapted to implement the cryptographic protocol in communication with other servers 2. The protocol logic may be implemented, in general, in hardware or software or a combination thereof. The first server compartment 4 also stores that server's current key share $K_i$ of the secret key K for use in the cryptographic protocol. The second server compartment 5 is inaccessible from network 3 in operation of the cryptographic protocol. This server compartment can be protected from network 3 by hardware and/or software mechanisms which inhibit unauthorized access to the compartment from the network in operation of the protocol. Exemplary mechanisms are described below. The second server compartment 5 comprises key-management logic providing functionality detailed below for periodically refreshing the key share $K_i$ stored by first server compartment 4. The key-management logic may again be implemented in hardware or software or a combination thereof. The second server compartment 5 also stores a set of master keys, denoted by $\{mk\}_i$ in the figure, for the server $S_i$. The key set $\{mk\}_i$ may comprise one or more master keys, one or more of which may be common to one or more other servers 2. The master key set $\{mk\}_i$ is used by the key-management logic to generate new key shares $K_i$ in successive refresh operations described below.

In general, the first and second server compartments 4, 5 may be implemented by computing apparatus comprising one or more general- or special-purpose computers, each comprising one or more (real or virtual) machines, providing functionality for implementing the operations described herein. Exemplary implementations will be described further below. The protocol and key-management logic of these server compartments may be described in the general context of computer system-executable instructions, such as program modules, executed by a computer system. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, program modules may be located in both local and remote computer system storage media including memory storage devices.

Figure 2:
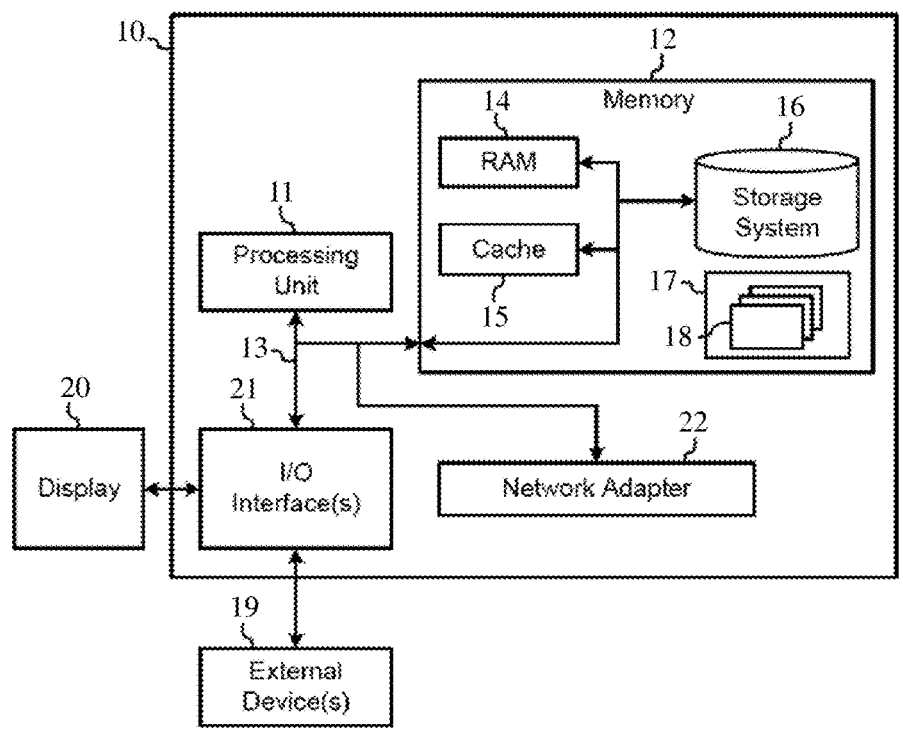
FIG. 2 is a generalized schematic of a computer in the FIG. 1 system.

FIG. 2 is a block diagram of exemplary computing apparatus for implementing a computer of server 2. The computing apparatus is shown in the form of a general-purpose computer 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

Figure 3:
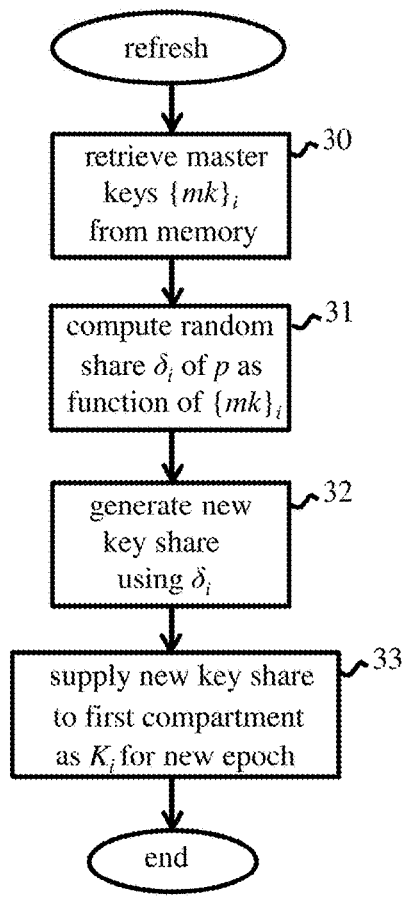
FIG. 3 indicates steps performed by a server of the FIG. 1 system to refresh a key share of the server.

In operation of system 1, the servers $S_i$ communicate via network 3 to implement the cryptographic protocol in which the key shares $K_i$ of a plurality of the servers can be combined to reconstruct the secret key K for the protocol. Proactive security is provided by operation of the second server compartments 5 of the servers. In particular, through operation of the key-management logic, the second server compartment 5 of each server is adapted, for each of successive time periods in operation of the cryptographic protocol, to unilaterally generate a new key share of the secret key K, and to supply the new key share to the first server compartment 4 as the current key share $K_i$ for that time period. The time periods, or "epochs", for which the key shares are refreshed may be defined in various ways in the system. For example, the refresh operation may be performed automatically for epochs of a predetermined duration, and/or a new epoch may be initiated in response to detection of an attack on system 1. FIG. 3 gives an overview of the main steps performed by the second server compartment 5 in the refresh operation for a new epoch.

In a first step, step 30, of the refresh operation, the key-management logic retrieves the set of master keys $\{mk\}_i$ from its location in memory operatively associated with the second server compartment 5. In step 31, the key-management logic computes a random share $\delta_i$ of a predetermined value p which is shared between the n servers 2 of the system. This random share $\delta_i$ comprises a function of the set of master keys $\{mk\}_i$. In step 32, the key-management logic uses the random share $\delta_i$ to generate a new key share $K_i$ for the new epoch. In step 33, the key-management logic supplies the new key share to the first server compartment 4. The new key share, which is stored in memory operatively associated with the first server compartment, becomes the server's current key share $K_i$ for the new epoch.

Through use of the master keys in this way in the second server compartment, each server $S_i$ can unilaterally generate new key shares in operation, whereby proactive security is achieved without requiring communication between servers for the key refresh process. Security of the key refresh procedure can be assured even if a server has been compromised in the previous epoch. This provides a significant advantage over prior systems with interactive key refresh processes. In those systems, it is not clear how the communication between servers can be secured if all of a server's keys may have been compromised during the previous epoch: an adversary may be privy to all keys and therefore able to impersonate the server.

The master key sets $\{mk\}_i$ and initial key shares $K_i$ for servers 2 may be provided in an initialization operation of the system. This initialization might be performed in various ways. For example, the master keys $\{mk\}_i$ could be generated independently, e.g. by a system controller, and communicated to individual servers $S_i$ via some secure message transmission functionality $F_{smt}$. In embodiments described below, one dedicated server, e.g. server $S_t$, generates all master key sets $\{mk\}_i$ which are then communicated to other servers via the secure message transmission functionality $F_{smt}$. This communication may, for example, be implemented by writing the initialization data to a physical medium (such as a USB drive, disc, etc.) which is distributed to server locations by courier and loaded to the servers by an operator. In preferred embodiments below, master keys may even be short enough to be written on paper and entered manually to the servers. Alternatively, for example, the message transmission functionality $F_{smt}$ may comprise a secure transmission channel established via a standard security protocol such as TLS (Transport Security Layer) or SSL (Secure Sockets Layer). While the initialization data could include the initial key shares $K_i$, in preferred embodiments these initial shares can be generated by the second server compartments 5 as demonstrated by examples below.

Figure 4:
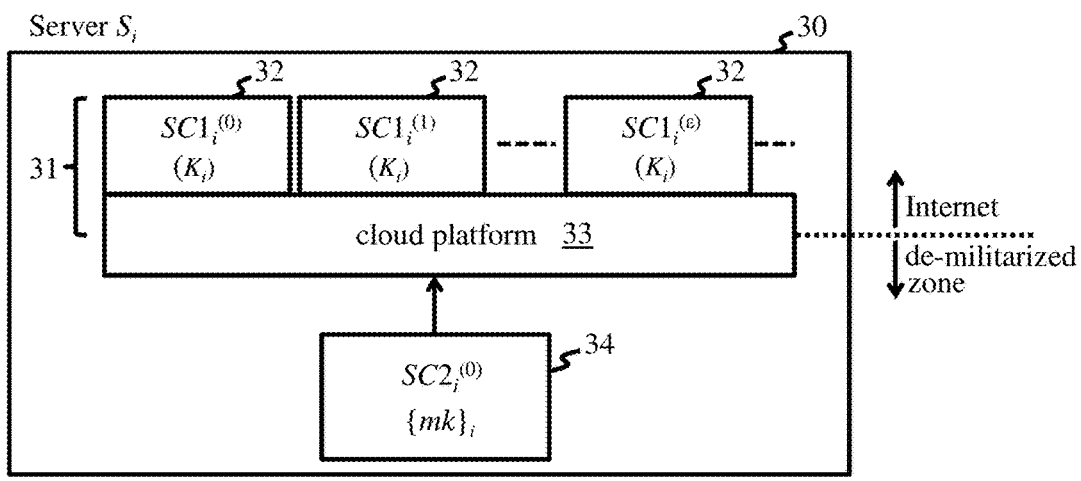
FIG. 4 is a schematic representation of an exemplary server implementation for the FIG. 1 system.

Operation of preferred embodiments will now be described in detail with reference to FIGS. 4 through 8. In these examples, n>2 servers $S_i$ are assumed to communicate via the Internet to implement the cryptographic protocol using shared key K. FIG. 4 illustrates a preferred implementation for each server $S_i$ of the system. In the server 30 of this example, the first server compartment 31 comprises a virtual machine 32, denoted by $SC1_i^{(\epsilon)}$ (where $\epsilon$=0, 1, 2, etc., indicates epoch number), running on a cloud computing platform 33. A fresh virtual machine $SC1_i^{(0)}$, $SC1_i^{(1)}$, $SC1_i^{(2)}$, etc., is initiated on platform 33 for each of successive epochs $\epsilon$=0, 1, 2, . . . , in operation. Cloud platform 33 may in general comprise one or more computers each supporting one or more virtual machines. In a typical implementation, the cloud platform 33 can be realized by a single physical machine or a cluster of physical machines. The second server compartment 34, denoted by $SC2_i$, comprises a single physical machine in this embodiment. This machine is connected only to the cloud software platform, and such connections can be physically isolated from the network (here the Internet) via which the virtual machines 32 communicate. In particular, the virtual machines) $SC1_i^{(0)}$, $SC1_i^{(1)}$, $SC1_i^{(\epsilon)}$, . . . , are exposed to the Internet, while the cloud platform 33 and second compartment $SC2_i$ are run in a protected environment (the "de-militarized zone"), i.e. behind one or more firewalls deployed in the cloud platform. The second compartment $SC2_i$ is thus inaccessible from the Internet in normal operation of the cryptographic protocol, and is therefore protected from unauthorized Internet access. (Authorized access may of course be possible if required, e.g. for setup purposes prior to operation).

With the implementation of FIG. 4, server 30 can exploit inherent features of modern cloud computing platforms such as, for instance, the Openstack platform. Such platforms offer strong separation between the virtual machines that are exposed to the Internet, and are thus subject to attacks, and the cloud management interfaces that run in the demilitarized zone. New virtual machines can be created on the fly from images, machines can be shut down, and the routing of traffic to machines be dynamically configured. The platforms can also virtualize the storage for the virtual machines, offering different kinds of abstraction of hard-disks (such as file system, block store, object store, etc.). System setup can be managed as a manual process via a web interface in the de-militarized zone. However, system management operations can easily be automated with scripts to replace manual interaction with software-based control.

In operation of the (n>2)-server system, the n virtual machines $SC1_i^{(\epsilon)}$ implementing first server compartments 31 communicate to implement a threshold cryptographic protocol. Such a protocol allows n servers to perform some cryptographic functionality in such a way that, as long as strictly less than a threshold number t≤n of the servers are corrupted, the functionality remains secure. Time is divided into epochs separated by key refresh procedures performed by the servers. The protocol must remain secure as long as less than t servers are corrupted in each epoch, but the set of corrupted servers may change from epoch to epoch. For each epoch $\epsilon$, a fresh virtual machine $SC1_i^{(\epsilon)}$ is set up, booted, and run on the cloud platform 33 at each server. These machines $SC1_i^{(\epsilon)}$ run the account creation and login request procedures of threshold cryptographic protocol, and read and write their states from the virtual storage provided to them by cloud platform 33. The second compartment $SC2_i$ of each server 30 controls the cloud platform 33, maintains the images for the virtual machines $SC1_i^{(\epsilon)}$, and prepares the state (stored operating data) that is given to each $SC1_i^{(\epsilon)}$ in order for it to run the account creation and login request protocols. The state for each $SC1_i^{(\epsilon)}$ is generated as a result of initialization and refresh procedures of the key management scheme in servers 30. Examples of these procedures are described for two embodiments below.

In a first embodiment, the key management scheme is based on pairwise shared secrets using pseudorandom functions. This scheme works for n-out-of-n threshold schemes, i.e., where t=n and security is preserved as long as not all of the servers are corrupted during the same epoch. Some preliminaries are described below to assist understanding of the embodiment to follow.

Pseudo-Random Functions. A pseudo-random function (PRF) is a function PRF: $\mathcal{K} \times \mathcal{D} \to \mathcal{R}$ where no polynomial-time adversary can distinguish an instantiation of PRF with a random key from a truly random function. The advantage $Adv_{A,PRF}^{prf}(\kappa)$ of an adversary A is defined as $|Pr[1=A^{PRF(K;\cdot)}:K \leftarrow_R \kappa]-Pr[1=A^{\$(\cdot)}]|$, where $\$(\cdot)$ is an oracle that implements a truly random function $\mathcal{D} \to \mathcal{R}$.

Combinatorial Secret Sharing. Let G be an additive group. A straightforward way to secret-share a secret key K∈G among servers $S_1$, . . . , $S_n$ is to choose random key shares $K_2$, . . . , $K_n \leftarrow_R$ G and set $K_1 \leftarrow K-\Sigma_{i=2}^n K_i$. Each server $S_i$ is given a key share $K_i$. To reconstruct K, they recompute $K \leftarrow \Sigma_{i=1}^n K_i$. The key shares can be refreshed by letting each server $S_i$ add a random share $\delta_i$ of a predetermined value p, where conveniently p=0, to their key share $K_i$. For example, $S_1$ could choose $\delta_2$, . . . , $\delta_n \leftarrow_R$ G, compute $\delta_1 \leftarrow -\Sigma_{i=2}^n \delta_i$, and send $\delta_i$ to $S_i$.

An observation underlying the embodiment below is that the same shares $\delta_1$, . . . , $\delta_n$ can be computed in a different way, by choosing $s_{\{i,j\}} \leftarrow_R$ G for all 1≤i<j≤n and handing $(s_{\{i,j\}})_{j=1, j\neq i}^n$ to $S_i$ for i=1, . . . , n. Note that there is a share $s_{\{i,j\}}$ for each pair of servers $\{S_i, S_j\}$, and that this share is known only to $S_i$ and $S_j$. Server $S_i$ can then compute its share of zero $\delta_i \leftarrow \Sigma j=1^n \Delta_{i,j} \cdot s_{\{i,j\}}$, where "·" represents multiplication and $\Delta_{i,j}=1$ if i<j
$\Delta_{i,j}=0$ if i=j
$\Delta_{i,j}=1$ if i>j One can easily see that $$\sum_{i=1}^n \delta_i = \sum_{i=1}^n \sum_{j=1}^n \Delta_{i,j} \cdot s_{\{i,j\}}$$
$$= \sum_{i=1}^n \sum_{j=i+1}^n (s_{\{i,j\}} - s_{\{i,j\}})$$
$$= 0.$$

The embodiment below exploits this technique for generating the shares $\delta_1$, $\delta_n$ to enable servers 30 to noninteractively generate arbitrarily many shares of p=0 by letting $s_{\{i,j\}}$ be generated pseudorandomly from a master key that is known only to servers $S_i$ and $S_j$.

Figures 5A, 5B:
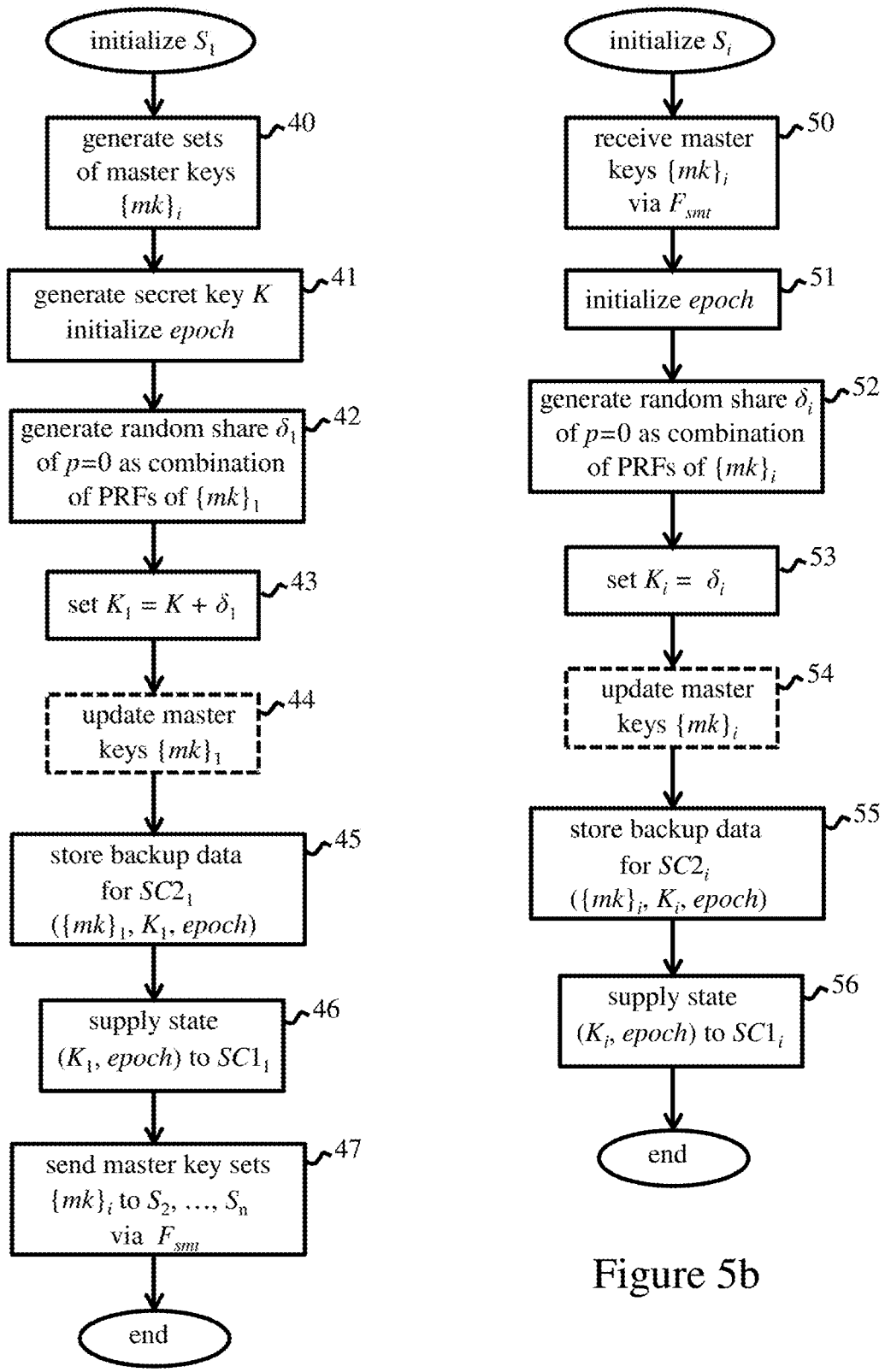
FIGS. 5a and 5b indicate steps performed by servers in an initialization procedure of a first embodiment.
Figure 6:
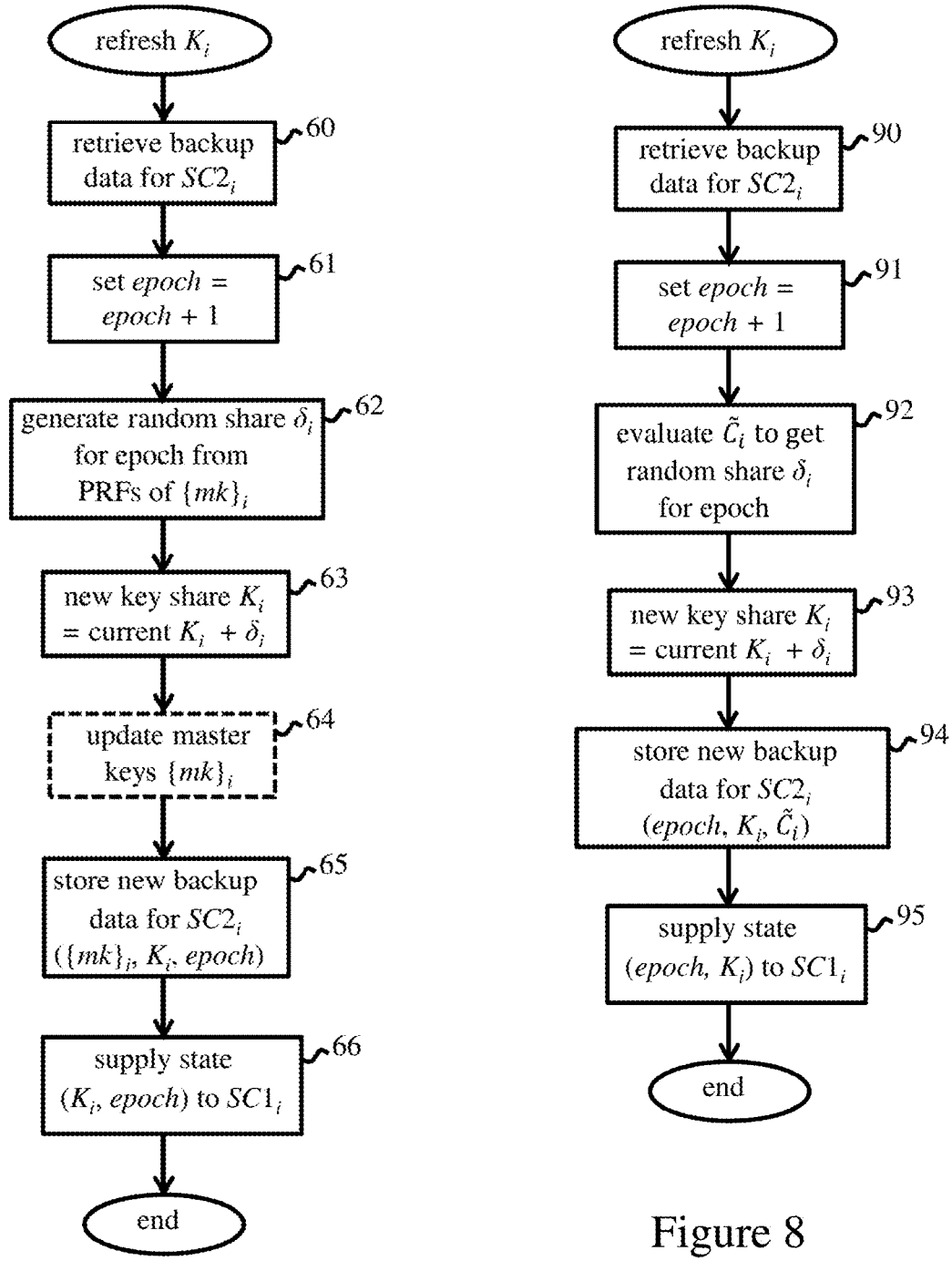
FIG. 6 indicates steps performed by a server to refresh a key share in the first embodiment.

FIGS. 5*a* and 5*b* indicate the initialization procedure of the first embodiment, and FIG. 6 indicates the key refresh procedure. One dedicated server, here $S_1$, performs the initialization steps indicated in FIG. 5*a*. In this process, the second server compartment $SC2_1$ of server $S_1$, generates and distributes a set of master keys $\{mk\}_i$ for all servers $S_1, \ldots, S_n$ in the system. It also generates a joint secret key K and uses its master keys $\{mk\}_1$ to compute its own initial key share $K_1$ of K. This key share $K_1$ forms part of the initial state $st_1$ of the first server compartment $SC1_1$ of $S_i$. The master keys for $S_i$ form part of the stored data $backup_1$ held in memory of second server compartment $SC2_1$.

Let PRF: $\{0,1\}^\kappa \times N \rightarrow G$ be a pseudorandom function, where $\kappa \in N$ is a security parameter (typically, $\kappa$=128). In step 40 of FIG. 5*a*, second server compartment $SC2_1$ generates the master keys for each server $S_i$ as follows:

for all $1 \le i < j \le n$, choose master keys $mk_{\{i,j\}} \leftarrow_R \{0,1\}^\kappa$. The set of master keys $\{mk\}_i = (mk_{\{i,j\}})_{j=1, j \ne i}^n$ for server $S_i$ thus comprises respective master keys common to each of the (n−1) other servers, $mk_{i,j}$ being the master key common to the $j^{th}$ server of the (n−1) other servers ($1 \le j \le n$, $j \ne i$).

In step 41, compartment $SC2_1$ generates the protocol key K to be distributed between the n servers, and initializes a variable epoch which takes a value indicative of the epoch count $\epsilon$ here:

choose $K \leftarrow_R G$; set epoch←0.

In step 42, compartment $SC2_1$ generates the server $S_1$'s random share of the predetermined value p, where p=0 here for simplicity:

compute $\delta_1 \leftarrow \Sigma_{j=2}^n$ PRF $(mk_{\{1,j\}}$, epoch)mod q, where $\Delta_{i,j}=1$ here since i=1, and q is a predetermined security parameter for the n servers.

In step 43, $SC2_1$ generates the initial key share $K_1$ for server $S_i$ by setting $K_1 \leftarrow K+\delta_1$. Step 44, indicated by dashed lines in the figure, indicates an optional step discussed further below.

In step 45, $SC2_1$ stores its backup data $backup_1$ as follows:

$backup_1 \leftarrow$(epoch, $K_1$, $(mk_{\{1,j\}})_{j=2}^n$).

In step 46, $SC2_1$ supplies the initial key share $K_1$ to the first server compartment $SC1_1$ as part of the state $st_1$:

set initial state of $SC1_1$ to $st_1$=(epoch, $K_i$).

In step 47, the sets of master keys $\{mk\}_i = (mk_{\{i,j\}})_{j=1, j \ne i}^n$ for the other servers $S_i$(i=2 to n) are securely distributed to the servers 30 via the secure message transmission functionality $F_{smt}$, discussed above. The initialization process for server $S_1$ is then complete.

FIG. 5*b* indicates the initialization procedure for each of the other servers $S_i \in \{S_2, \ldots, S_n\}$ of the system. In this process, the server $S_i$ receives and stores its set of master keys $\{mk\}_i$ in memory of second server compartment $SC2_i$, and generates its initial key share $K_i$ of the key K. This key share $K_i$ forms part of the initial state $st_i$ of the first server compartment $SC1_i$ of $S_i$.

In step 50, the second server compartment $SC2_i$ receives its set of master keys $\{mk\}_i = (mk_{\{i,j\}})_{j=1, j \ne i}^n$ via $F_{smt}$. In step 51, $SC2_i$ initializes the variable epoch:

set epoch←0.

In step 52, compartment $SC2_i$ generates server $S_i$'s random share of p=0:

compute $\delta_i \leftarrow \Sigma_{j=1, j \ne i}^n \Delta_{i,j}$ PRF $(mk_{\{i,j\}}$, epoch)mod q, where $\Delta_{i,j}$ is as defined earlier, i.e.:

$\Delta_{i,j}=1$ if i<j
$\Delta_{i,j}=0$ if i=j
$\Delta_{i,j}=-1$ if i>j.

In step 53, $SC2_i$ generates the initial key share $K_i$ for $S_i$ as $K_i \leftarrow \delta_i$. Step 54 again indicates an optional step described later.

In step 55, $SC2_i$ stores its backup data $backup_i$ in memory of second server compartment $SC2_i$:

$backup_i \leftarrow$(epoch, $K_i$, $(mk_{\{i,j\}})_{j=1, j \ne i}^n$).

In step 56, $SC2_1$ supplies the initial key share $K_i$ to the first server compartment $SC1_i$ as part of the state $st_i$:

set initial state of $SC1_i$ to $st_i$=(epoch, $K_i$).

The initialization process for server $S_i$ is then complete.

After initialization of the n servers as described above, the servers can communicate via the Internet to implement the threshold cryptographic protocol. For each successive epoch in this operation, the second server compartment $SC2_i$ of each server unilaterally generates a new key share $K_i$ for that server via the key-refresh process of FIG. 6. In step 60 of this process, the second server compartment $SC2_i$ retrieves its backup data from memory:

recover $backup_i \leftarrow$(epoch, $K_i$, $(mk_{\{i,j\}})_{j=1, j \ne i}^n$)

In step 61, $SC2_i$ updates the epoch count for the new epoch:

set epoch←epoch+1.

In step 62, $SC2_i$ computes a new random share $\delta_i$ of p=0 for server $S_i$:

compute $\delta_i \leftarrow \Sigma_{j=1, j \ne i}^n \Delta_{i,j}$ PRF $(mk_{\{i,j\}}$, epoch)mod q.

The random share $\delta_i$ thus comprises a combination of pseudorandom functions of respective master keys $mk_{\{i,j\}}$.

In step 63, $SC2_i$ generates a new key share for $S_i$ as a combination (in this example a sum) of the current key share $K_i$ (stored in $backup_i$ for the previous epoch) and the new random share $\delta_i$:

set new key share $K_i \leftarrow$ current key share $K_i + \delta_i$.

Step 64 again indicates an optional step described later. In step 65, $SC2_i$ stores new backup data $backup_i$ in memory:

$backup_i \leftarrow$(epoch, $K_i$, $(mk_{\{i,j\}})_{j=1, j \ne i}^n$).

In step 66, $SC2_i$ supplies the new key share $K_i$ to the first server compartment $SC1_i$ as part of the state $st_i$ for the new epoch:

set new state of $SC1_i$ to $st_i$=(epoch, $K_i$).

The new key share $K_i$ thus becomes the server's current key share for the new epoch, and the key refresh process is complete.

The above scheme allows key shares to be unilaterally refreshed by each server, with refresh raking place in a secure environment provided by the second server compartment with access to trusted backup data. Use of a fresh virtual machine for the first server compartment in each epoch conveniently eliminates any contamination of the first compartment due to server compromise in the preceding epoch. The system remains secure provided that not all n servers in the system are compromised in the same epoch. An additional advantage of this embodiment is that communication keys used by servers 30 to communicate for the threshold cryptographic protocol can be refreshed via the technique for generating the shares $s_{\{i,j\}}$ in the above scheme. The communication keys are typically symmetric keys known to respective pairs of servers in the system. The communication key for a pair of servers $\{S_i, S_j\}$ is thus analogous to the master key $mk_{i,j}$ common to those servers in the above system. Such a key can therefore be unilaterally refreshed by each server $S_i$, $S_j$ in the same way as the shares $s_{\{i,j\}}$ above, i.e. as:

$s_{i,j}$=PRF($mk_{i,j}$, epoch)mod q, where $mk_{i,j}$ signifies the communication key for servers $S_i$, $S_j$ in this context, and $s_{i,j}$ is the refreshed key.

A modification to the above embodiment can additionally provide so-called "forward security" in the system. That is, even if the backup data backup$_i$ of a server $S_i$ were to leak, then the adversary would still be unable to recompute all $S_i$'s past key shares. This is achieved by addition of the optional steps 44, 54 and 64 in FIGS. 5a, 5b and 6. In these steps, the second server compartment SC2$_i$ updates each master key mk$_{ij}$ for each new epoch, the updated master key comprising a one-way function of that master key mk$_{ij}$ for the preceding epoch.

More specifically, let OWF: $\{0,1\}^\kappa \to \{0,1\}^\kappa$ be a one-way function, i.e., given y=OWF(x) for a random $x \leftarrow_R \{0,1\}^\kappa$, it is hard to compute x' such that y=OWF(x'). The initialization and refresh procedures proceed as before, but in the appropriate step 44, 54 or 64 of each process, SC2$_i$ updates the master keys to:

updated master keys mk$_{\{i,j\}} \leftarrow$OWF(current master keys mk$_{\{i,j\}}$)

The updated master keys mk$_{\{i,j\}}$ are then stored as part of backup$_i$ as before.

A second key management scheme for use in servers 30 is described in the following. This construction is based on software obfuscation and works for t-out-of-n threshold schemes where the servers' shares are computed as the evaluations of a random polynomial of degree t−1. As is well known in the art, code obfuscation is a tool that renders executable software code "unintelligible", in the sense that the internal structure and data of the code can no longer be inspected, while preserving the functionality of the code. Many heuristic approaches to code obfuscation techniques exist, some examples being described in "Watermarking, tamper-proofing, and obfuscation-tools for software protection", Collberg and Thomborson, IEEE Transactions on Software Engineering, 28(8):735-746, 2002 and references therein. As another example, "Candidate indistinguishability obfuscation and functional encryption for all circuits", Garg et al., 54th FOCS, pages 40-49, IEEE Computer Society Press, October 2013, shows how a weak form of obfuscation can be achieved cryptographically. Some preliminaries for the second scheme are as follows.

Shamir's Secret Sharing. To share a secret key K∈G among a set of servers $S_1, \ldots, S_n$ so that any subset of size t can recover K, Shamir suggested the following approach that underlies almost all practical t-out-of-n threshold cryptography schemes. The dealer (e.g., $S_1$) chooses a random polynomial f(x) of degree t−1 such that f(0)=K, for example, by choosing random coefficients $a_1, \ldots, a_{t-1} \leftarrow_R G$ and letting $f(x)=K+a_1 x + \ldots + a_{t-1} x^{t-1}$. The dealer hands $S_i$ its key share $K_i$=f(i). Given t different points (i, $K_i$) of the polynomial for $S_i \subseteq \{1, \ldots, n\}$, #S=t, one can use Lagrange interpolation to reconstruct the polynomial as $$f(x) = \sum_{i \in S} \prod_{j \in S\setminus\{i\}} \frac{x-j}{i-j} K_i$$

and therefore recompute the key K=f(0) as $K = \sum_{i \in S} \lambda_{S,i} K_i$ where $\lambda_{S,i}$ are the Lagrange coefficients $\lambda_{S,i} = \prod_{j \in S\setminus\{i\}} j(j-i)$.

Obfuscation. An obfuscation scheme O for a family of circuit classes $\{C_\kappa\}$ is an algorithm Obf that, on input of security parameter κ and a circuit C, generates an obfuscated circuit $\tilde{C} \leftarrow$ Obf ($1^\kappa$, C). The obfuscated circuit $\tilde{C}$ has the same functionality as C, meaning that for all κ∈N, for all circuits $C \in C_\kappa$, and for all inputs x we have that $Pr[\tilde{C}(x)=C(x) : \tilde{C} \leftarrow Obf(1^\kappa, C)]=1$ (or almost 1, for a slightly weaker constraint). Without making any formal security statements, the obfuscation scheme is such that the obfuscated circuit $\tilde{C}$ does not reveal any information about the internal structure of C.

Figures 7A, 7B:
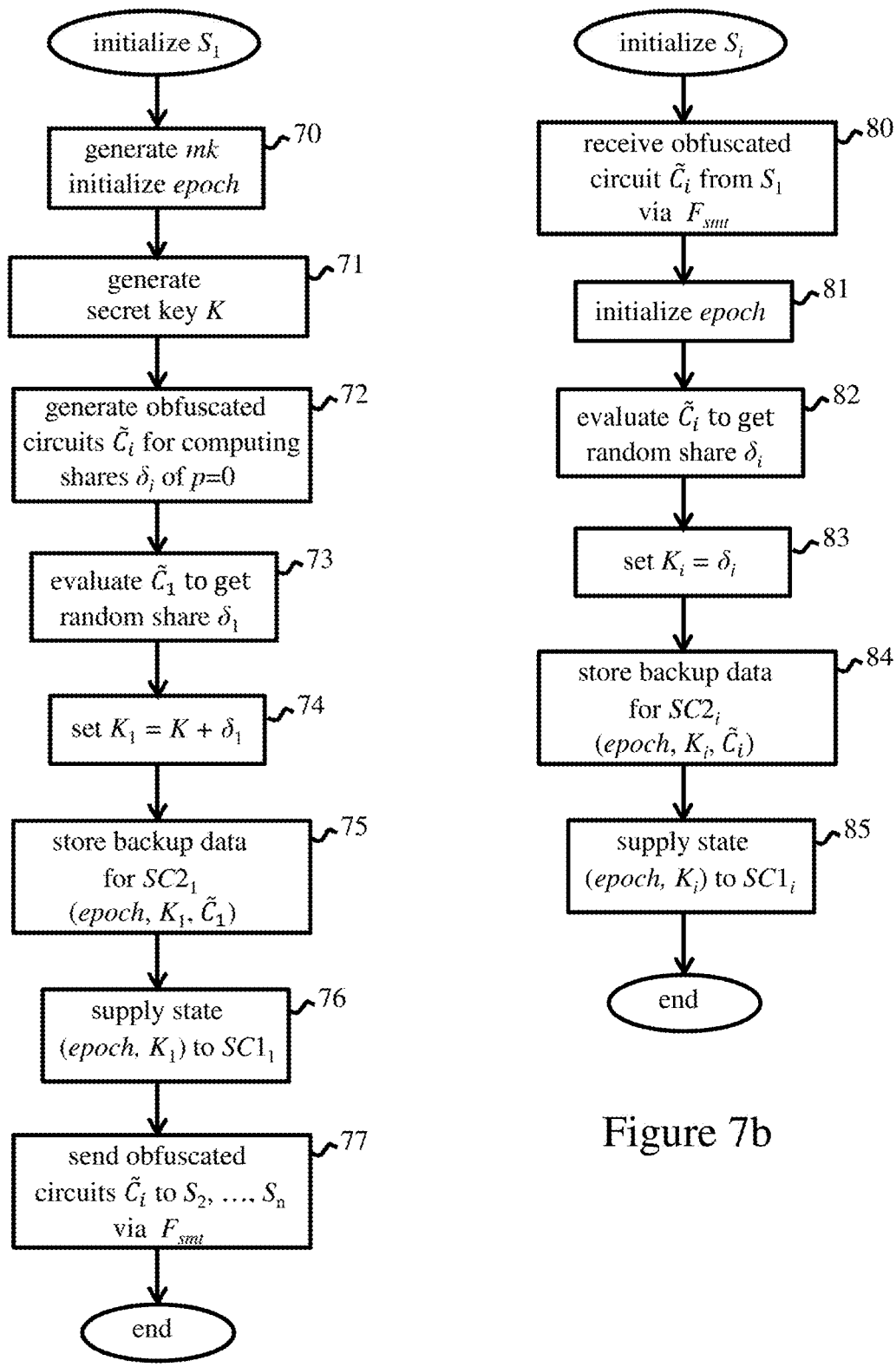
FIGS. 7a and 7b indicate steps performed by servers in an initialization procedure of a second embodiment.

In the following scheme, let PRF: $\{0,1\}^\kappa \times N \to G$ be a pseudorandom function and let Obf be an obfuscation algorithm. FIGS. 7a and 7b indicate the initialization procedure of this embodiment, and FIG. 8 indicates the key refresh procedure. FIG. 7a indicates the initialization process in one dedicated server, here server $S_1$. In this process, the second server compartment SC2$_1$ of $S_1$ generates a joint secret key K and distributes obfuscated circuits that generate and evaluate a new random polynomial at each epoch.

In step 70 of FIG. 7a, second server compartment SC2$_1$ generates a master key mk and initializes the variable epoch:

choose master mk$\leftarrow_R \{0,1\}^\kappa$; set epoch$\leftarrow$0.

The set of master keys $\{mk\}_i$ in this embodiment thus comprises the single master key mk.

In step 71, SC2$_1$ generates the joint secret key K by choosing K$\leftarrow_R$ G.

In step 72, SC2$_1$ generates obfuscated circuits $\tilde{C}_i$ for each server $S_i$:

For i=1, . . . , n, generate an obfuscated circuit $\tilde{C}_i$ that evaluates the following program:

Program $C_i$ (epoch):

for j=1, . . . , t−1 let $a_j$=PRF(mk, epoch*(n+i)(t+j))

let $f(x)=a_1 x + \ldots + a_{t-1} x^{t-1}$ return $\delta_i$=f(i)

where * represents multiplication here. Note that the master key mk and the index i are embedded the circuit $C_i$, while the epoch number is taken as input. Each obfuscated circuit $\tilde{C}_i$ thus evaluates a random polynomial of degree t−1 (t≤n) having coefficients $a_1, \ldots, a_{t-1}$ comprising respective pseudorandom functions of the master key mk. The obfuscated circuit computes the random share $\delta_i$ of predetermined value p (where p=0 in this example) which is shared between the n servers.

In step 73, SC2$_1$ evaluates the obfuscated circuit $\tilde{C}_1$ to obtain its random share $\delta_1$ for epoch=0:

evaluate $\delta_1 = \tilde{C}_1(0)$.

In step 74, SC2$_1$ generates the initial key share $K_1$ for server $S_1$ by setting $K_1 \leftarrow K+\delta_1$.

In step 75, SC2$_1$ stores its backup data backup$_1$ as follows:

store backup$_1 \leftarrow$(epoch, $K_1$, $\tilde{C}_1$).

In step 76, SC2$_1$ supplies the initial key share $K_1$ to the first server compartment SC1$_1$ as part of the state st$_1$:

set the initial state of SC1$_1$ to st$_1 \leftarrow$(epoch, $K_1$).

In step 77, the obfuscated circuits $\tilde{C}_i$ for the other servers $S_i$ (i=2 to n) are securely distributed to the servers 30 via the secure message transmission functionality $F_{smt}$. The initialization process for $S_1$ is then complete.

FIG. 7b indicates the initialization procedure for each of the other servers $S_i \in \{S_2, \ldots, S_n\}$ of the system. In this process, the server $S_i$ receives and stores its obfuscated circuit $\tilde{C}_i$, with embedded master key mk, and generates its initial key share $K_i$ of the key K.

In step 80 of FIG. 7b, the second server compartment SC2$_i$ receives obfuscated circuit $\tilde{C}_i$ from $S_1$ via $F_{smt}$. In step 81, SC2$_i$ initializes the variable epoch:

set epoch$\leftarrow$0.

In step 82, SC2$_i$ evaluates the obfuscated circuits $\tilde{C}_i$ to obtain its random share $\delta_i$ for epoch=0:

evaluate $\delta_i = \tilde{C}_i(0)$.

In step 83, SC2$_i$ generates the initial key share $K_i$ for server $S_i$ by setting $K_i \leftarrow \delta_i$.

In step 84, SC2$_i$ stores its backup data backup$_i$ as follows:

store backup$_i \leftarrow$(epoch, $K_i$, $\tilde{C}_i$).

In step 85, $SC2_i$ supplies the initial key share $K_i$ to the first server compartment $SC1_i$ as part of the state $st_i$:

set the initial state of $SC1_i$ to $st_i \leftarrow (epoch, K_i)$.

The initialization process for $S_i$ is then complete.

FIG. 8 indicates the key refresh process performed by servers 30 for each new epoch in subsequent operation of the threshold cryptographic protocol. In step 90 of this process, the second server compartment $SC2_i$ retrieves its backup data from memory:

recover $backup_i \leftarrow (epoch, k_i, \tilde{C}_i)$.

In step 91, $SC2_i$ updates the epoch count for the new epoch:

set epoch←epoch+1.

In step 92, $SC2_i$ computes a new random share $\delta_i$ by evaluating its obfuscated circuit for the new epoch:

evaluate $\delta_i = \tilde{C}_i(epoch)$.

In step 93, $SC2_i$ generates a new key share for $S_i$ as a combination (here a sum) of the current key share $K_i$ (stored in $backup_i$ for the previous epoch) and the new random share $\delta_i$:

set new key share $K_i \leftarrow$ current key share $K_i + \delta_i$.

In step 94, $SC2_i$ updates its backup data $backup_i$ as follows:

store $backup_i \leftarrow (epoch, K_i, \tilde{C}_i)$.

In step 95, $SC2_i$ supplies the new key share $K_i$ to the first server compartment $SC1_i$ as part of the state $st_i$ for the new epoch:

set new state of $SC1_i$ to $st_i \leftarrow (epoch, K_i)$.

The new key share $K_i$ thus becomes the server's current key share for the new epoch, and the key refresh process is complete.

As with the first embodiment, the above scheme permits secure refresh of key-shares without communication between the servers. The system remains secure provided that less than t servers are compromised in the same epoch. In a modification to this embodiment, forward security can also be provided to prevent compromise of the backup data $backup_i$ resulting in leakage of a server $S_i$'s past key shares. This is achieved by causing the obfuscated circuit $\tilde{C}_i$ to produce as part of its output a new obfuscated circuit $\tilde{C}_i'$ that will only generate shares for epochs after the current one. That is, the obfuscated circuit $\tilde{C}_i$ stored for each epoch further generates an updated obfuscated circuit, operable only for subsequent epochs, for computing the random share $\delta_i$. The updated obfuscated circuit is then stored as the obfuscated circuit for the next epoch.

More precisely, let the obfuscated circuit $\tilde{C}_i$ in the above scheme evaluate the following program:

Program $C_{i,curr}$ (epoch):
 if epoch≤curr then abort
 for j=1, . . . , t−1 let $a_j$=PRF(mk, epoch*(n+i)(t+j))
 let $f(x) = a_1 x + \ldots + a_{t-1} x^{t-1}$
 generate $\tilde{C}_i' = Obf(C_{i,curr})$
 return $(\delta_i = f(i), \tilde{C}_i')$.

Note that a current epoch value curr is hardcoded into the circuit. The obfuscated circuit outputs an updated obfuscated circuit $\tilde{C}_i'$ in which curr is set to the current value of epoch, i.e. the epoch in which $\tilde{C}_i'$ is produced. The updated obfuscated circuit $\tilde{C}_i'$ is then stored as part of $backup_i$ (steps 75, 84 and 94 in the figures) and becomes the new obfuscated circuit for the next epoch (of value curr+1). The obfuscated circuit therefore cannot be run for inputs epoch corresponding to previous epochs. At initialization, $S_1$ generates and distributes obfuscations of $C_{i,0}$. At each refresh, $S_i$ replaces $\tilde{C}_i$ in its backup with the updated obfuscated circuit $\tilde{C}_i'$.

It will of course be appreciated that many other changes and modifications can be made to the exemplary embodiments above. For example, the above schemes can be modified to accommodate a shared value p which is a constant other than zero. Also, new key shares may be based on combinations other than a simple sum of the random shares $\delta_i$ and current key shares $K_i$. While constructions based on additive groups have been described, these constructions can be readily adapted to other groups, such as multiplicative groups. Various other server implementations can also be envisaged. For example, the data (master keys, etc.) generated by $S_1$ in the above schemes could be written to a secure device such as a smart card, HSM (Hardware Security Module), TPM (Trusted Platform Module) or similar device which is then distributed to the other servers. This device may then also implement the required functionality of the second server compartment $SC2_i$. Embodiments might also be envisaged where the second server compartment $SC2_i$ is implemented by a hypervisor controlling operation of one or more virtual machines providing the first server compartment $SC1_i$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server for operation as one of n≥2 servers and implementing a cryptographic protocol using a secret key K which is shared between the n servers, the server comprising:
   a network adapter coupling the server to a network including the n servers;
   a first server compartment which implements the cryptographic protocol in communication with at least another server of the n servers, and which stores a current key share of the secret key K; and
   a second server compartment, which is inaccessible from the network in operation of the server, and which stores a set of master keys, wherein the set of master keys is embedded in an obfuscated circuit, stored by the second server compartment, for computing the random share;
   the second server compartment, for each of successive time periods in the operation of the server, unilaterally generating a new key share of the secret key K and supplying the new key share to the first server compartment as the current key share, wherein the new key share comprises a random share of a predetermined value p which is shared between the n servers, and the random share comprises a function of the set of master keys.

2. The server as claimed in claim 1 wherein the second server compartment stores the current key share for each time period of the successive time periods and the new key share for each time period comprises a combination of the current key share for an immediately previous one of the successive time periods and the random share.

3. The server as claimed in claim 1 wherein n>2 and the set of master keys comprises respective master keys common to each of the servers other than the server, and wherein the random share comprises combination of pseudorandom functions of respective master keys.

4. The server as claimed in claim 1 wherein the predetermined value p=0.

5. The server as claimed in claim 3 wherein the server is the $i^{th}$ server ($1 \le i \le n$) of the n servers and the random share is given by:

$$\delta_i = \sum_{j=1, j \ne i}^{n} \Delta_{i,j} PRF(mk_{\{i,j\}}, epoch) \bmod q$$

where $\Delta_{i,j} = 1$ if $i < j$
$\Delta_{i,j} = 0$ if $i = j$
$\Delta_{i,j} = -1$ if $i > j$ and where:
$\delta_i$ is the random share;
PRF is a pseudorandom function;
$mk_{i,j}$ is the master key common to the $j^{th}$ server of the servers ($1 \le j \le n, j \ne i$);
epoch is a value indicative of a time period; and
q is a security parameter for the n servers.

6. The server as claimed in claim 5 wherein the second server compartment stores the current key share for each time period of the successive time periods and the new key share for each time period comprises a sum of the current key share for an immediately previous time period and the random share $\delta_i$.

7. The server as claimed in claim 5 wherein the second server compartment is adapted to generate an updated master key $mk_{ij}$ for each of the successive time periods, each of the updated master keys comprising a one-way function of a preceding master key $mk_{ij}$ generated for an immediately preceding time period in the successive time periods.

8. The server as claimed in claim 1 wherein the set of master keys comprises a single master key mk.

9. The server as claimed in claim 8 wherein said obfuscated circuit evaluates a random polynomial of degree t−1 ($t \le n$) having coefficients $a_1, \ldots, a_{t-1}$ comprising respective pseudorandom functions of the master key mk.

10. The server as claimed in claim 9 wherein the predetermined value p=0.

11. The server as claimed in claim 10 wherein the server is the server ($1 < i < n$) of the n servers and the obfuscated circuit CL evaluates a circuit C, defined by:
Program C(epoch):
for j=1, . . . , t−1 let $a_j$=PRF(mk, epoch*(n+i)(t+j))
let f(x)=$a_1$x+ . . . +$a_{t-1}x^{t-1}$
return $\delta_i$=f(i)
where:
δt is said random share;
PRF is a pseudorandom function; and
epoch is a value indicative of said time period.

12. The server as claimed in claim 11 wherein n>2.

13. The server as claimed in claim 11 wherein the second server compartment stores the current key share for each time period of the successive time periods and the new key share for the time period comprises a sum of the current key share stored for an immediately preceding time period and the random share $\delta_i$.

14. The server as claimed in claim 11 wherein the obfuscated circuit stored for each time period of the successive time periods further generates an updated obfuscated circuit, operable only for time periods subsequent to the time period, for computing the random share $\delta_i$, and wherein the updated obfuscated circuit is stored as the obfuscated circuit for a time period immediately subsequent to the time period.

15. The server as claimed in claim 1 wherein the first server compartment comprises a virtual machine on a cloud computing platform.

16. The server as claimed in claim 15 wherein the first server compartment comprises a fresh virtual machine for each time period of the successive time periods.

17. A server system having $n \ge 2$ servers, implementing a cryptographic protocol using a secret key K which is shared between the n servers, wherein each server comprises:
a network adapter coupling the server to a network including the n servers;
a first server compartment, which implements the cryptographic protocol, and which stores a current key share of the secret key K; and
a second server compartment, inaccessible from the network in operation of the server, which stores a set of master keys, wherein the set of master keys is embedded in an obfuscated circuit, stored by the second server compartment, for computing the random share;
the second server compartment being adapted, for each of successive time periods in the operation of the server, to unilaterally generate a new key share of the secret key K and to supply the new key share to the first server compartment as the current key share, wherein the new key share comprises a random share of a predetermined value p which is shared between the n servers, and the random share comprises a function of the set of master keys.

18. A method for refreshing a key share of a secret key K, which is shared between $n \ge 2$ servers for use in a cryptographic protocol, the method comprising, at a server of the servers:
providing a network adapter coupling the server to a network including the n servers;
providing a first server compartment, which implements the cryptographic protocol, and which stores a current key share of the secret key K;
providing a second server compartment, inaccessible from the network in operation of the cryptographic protocol, which stores a set of master keys, wherein the set of master keys is embedded in an obfuscated circuit, stored by the second server compartment, for computing the random share; and
at the second server compartment, for each of successive time periods in operation of the cryptographic protocol, unilaterally generating a new key share of the secret key K and supplying the new key share to the first server compartment as the current key share, wherein the new key share comprises a random share of a predetermined value p which is shared between the n servers, and the random share comprises a function of the set of master keys.

19. A computer program product for refreshing a key share of a secret key K, which is shared between $n \ge 2$ servers for use in a cryptographic protocol, the computer program product comprising a computer readable storage medium having program instructions embodied therein, the program instructions being executable by a server of the servers, the server having a network adapter coupling the server to a network including the n servers, a first server compartment, which implements the cryptographic protocol, and which stores a current key share of the secret key K, and a second server compartment, inaccessible from the network in operation of the cryptographic protocol, which stores a set of master keys, wherein the set of master keys is embedded in an obfuscated circuit, stored by the second server compartment, for computing the random share, the program instructions being executable to cause the second server compartment to:
- unilaterally generate, for each of successive time periods in operation of the cryptographic protocol, a new key share of the secret key K; and
- supply the new key share to the first server compartment as the current key share;
- wherein the new key share comprises a random share of a predetermined value p which is shared between the n servers, and the random share comprises a function of the set of master keys.

* * * * *